United States Patent
Gunda et al.

(10) Patent No.: US 9,229,943 B2
(45) Date of Patent: *Jan. 5, 2016

(54) ADDRESSING CROSS-ALLOCATED BLOCKS IN A FILE SYSTEM

(71) Applicant: International Business Machines Corporation, Armonk, NY (US)

(72) Inventors: Kalyan C. Gunda, Bangalore (IN); Srikanth Srinivasan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,281

(22) Filed: Dec. 15, 2014

(65) Prior Publication Data

US 2015/0106336 A1   Apr. 16, 2015

Related U.S. Application Data

(63) Continuation of application No. 13/288,376, filed on Nov. 3, 2011.

(51) Int. Cl.
*G06F 17/30* (2006.01)
*G06F 11/14* (2006.01)

(52) U.S. Cl.
CPC ...... *G06F 17/30088* (2013.01); *G06F 11/1435* (2013.01); *G06F 11/1453* (2013.01); *G06F 17/30138* (2013.01)

(58) Field of Classification Search
CPC .......... G06F 17/30067; G06F 11/1435; G06F 11/10; G06F 2201/84; G06F 3/0643; G06F 12/023; G06F 11/1456; G06F 17/30088; G06F 11/1466; G06F 17/30138; G06F 11/1425; G06F 12/0817; G06F 12/06; G06F 11/2094; G06F 9/3834; G06F 2211/1004; G06F 3/0644; G06F 11/1402; G06F 11/1471; G06F 12/1009; G06F 12/1483; G06F 13/14; G06F 9/5016; G06F 11/1453
USPC ................. 711/154, 161–162, 170–173, 209; 707/640, 648, 649, 705, 752, 753, 754
See application file for complete search history.

(56) References Cited

U.S. PATENT DOCUMENTS

| | | |
|---|---|---|
| 5,623,651 A | 4/1997 | Jernigan, IV |
| 6,874,004 B2 | 3/2005 | Jolly |
| 7,818,302 B2 | 10/2010 | Godbole |

(Continued)

OTHER PUBLICATIONS

Combined Search and Examination Report under Sections 17 and 18(3) dated Mar. 28, 2013, GB Application No. GB1219154.0, 6 pages.

*Primary Examiner* — Zhuo H Li
(74) *Attorney, Agent, or Firm* — Francis Lammes; Stephen J. Walder, Jr.; Randall J. Bluestone

(57) ABSTRACT

A mechanism is provided for cross-allocated block repair in a mounted file system. A set of cross-allocated blocks are identified from a plurality of blocks within an inode of the mounted file system, based on a corresponding bit associated with each cross-allocated block in a duplicated block information bitmap being in a first identified state. The set of cross-allocated blocks are repaired using a user-defined repair process. Then one or more of the set of cross-allocated blocks are deallocated based on results of the user-defined repair process.

12 Claims, 4 Drawing Sheets

(56) References Cited

U.S. PATENT DOCUMENTS

| | | | |
|---|---|---|---|
| 8,190,835 B1 * | 5/2012 | Yueh | 711/162 |
| 8,615,500 B1 | 12/2013 | Armangau et al. | |
| 8,615,550 B2 * | 12/2013 | Fischer et al. | 709/204 |
| 2003/0204533 A1 | 10/2003 | Jolly | |

* cited by examiner

ADDRESSING CROSS-ALLOCATED BLOCKS IN A FILE SYSTEM

BACKGROUND

The present application relates generally to an improved data processing apparatus and method and more specifically to mechanisms for addressing cross-allocated blocks in a file system.

A file system is a means to organize data expected to be retained after a program terminates by storing, retrieving, and updating data, as well as managing available space on device(s) which comprises the file system. A file system organizes data in an efficient manner and is tuned to characteristics specific to the device or disk which comprises the file system. Some file systems provide mechanisms to control access to the data and metadata. Ensuring reliability is a major responsibility of a file system.

Some current disks support many different file systems providing flexibility so that many operating systems may be supported, file systems such as: ext, ext2, xia, minix, umsdos, msdos, vat, proc, smb, ncp, iso9660, sysv, hpfs, affs, and ufs, and no doubt, over time more will be added. Each of the separate file systems may be combined into a single hierarchical tree structure that represents the file system as one whole single entity. That is, as each new files system is mounted on a disk, the disk adds the new file system into this single file system tree.

When a disk is initialized, the disk has a partition structure imposed that divides the physical disk into a number of logical partitions. Each partition may hold a single file system. File systems organize files into logical hierarchical structures with directories, soft links, and so on, held in blocks on physical devices. Devices that can contain file systems are known as block devices. These block devices are, thus, simply linear collections of blocks that exist without regard to the underlying physical disk's geometry. It is the task of a block device driver associated with each block to map a request to read a particular block of its disk into terms meaningful to its disk; the particular track, sector, and cylinder of its hard disk where the block is kept.

Thus, the files in a file system are collections of data. A file system not only holds the data that is contained within the files of the file system but also the structure of the file system. Thus, a layout of a file system may be illustrated as the file system occupying a series of blocks in a block structured device. So far as each file system is concerned, block devices are just a series of blocks that can be read and written. The file system divides the logical partition that it occupies into block groups. Each block group duplicates information critical to the integrity of the file system as well as holding real files and directories as blocks of information and data.

In a file system, an inode is the basic building block. Every file and directory in the file system is described by one and only one inode. If a block is referred to across multiple inodes or multiple times within the same inode, these are called cross-allocated blocks or duplicate blocks. Such allocations are quite dangerous as these cross-allocated blocks or duplicate blocks point to data corruption and at times having an inode(s) referring a block that is already freed—caused by one of the other inodes that was cross referring the block being freed.

SUMMARY

In one illustrative embodiment, a method, in a data processing system, is provided for cross-allocated block repair in a mounted file system. The illustrative embodiment identifies a set of cross-allocated blocks from a plurality of blocks within an inode of the mounted file system, based on a corresponding bit associated with each cross-allocated block in a duplicated block information bitmap being in a first identified state. The illustrative embodiment repairs the set of cross-allocated blocks using a user-defined repair process. The illustrative embodiment deallocates one or more of the set of cross-allocated blocks based on results of the user-defined repair process.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As discussed above, if a block is referred to across multiple inodes or multiple times within the same inode, these are called cross-allocated blocks or duplicate blocks. Such allocations are quite dangerous as these cross-allocated blocks point to data corruption and at times having an inode(s) referring a block that is already freed—caused by one of the other inodes that was cross referring the block being freed. Current solutions to fix cross-allocated blocks require un-mounting the file system, scanning the block allocation picture, identifying cross-allocated blocks, and repairing the cross-allocated blocks accordingly. However, these solutions require a file system outage. Further the larger the file system, the longer the scan takes, thus the longer the file system outage window.

Therefore, the illustrative embodiments provide mechanisms for identifying file system blocks that are cross allocated across inodes and repairing the cross-allocated block while on a mounted file system. The mechanisms identify the cross-allocated blocks by scanning a point in time read only copy of the file system, i.e. temporary snapshots taken just before the scan begins, and use this information as a reference point to scan the mounted file system and repair the inodes which refer to the identified cross-allocated blocks. The mechanisms ensure that the cross-allocated blocks are repaired without a need for file system outage.

Figure 1:
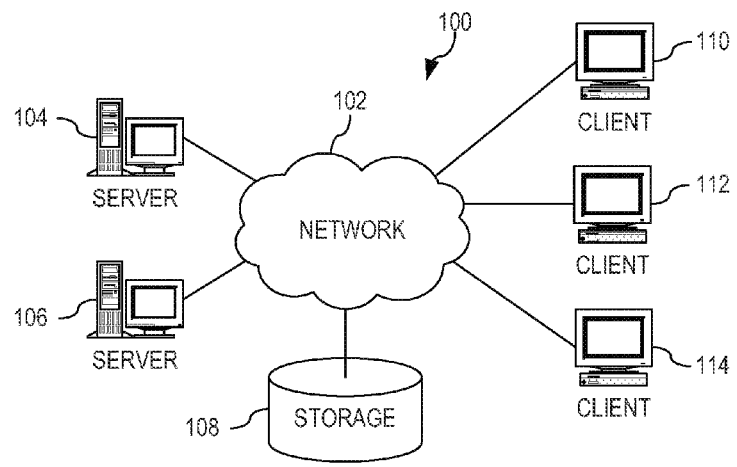
FIG. 1 depicts a pictorial representation of an example distributed data processing system in which aspects of the illustrative embodiments may be implemented.
Figure 2:
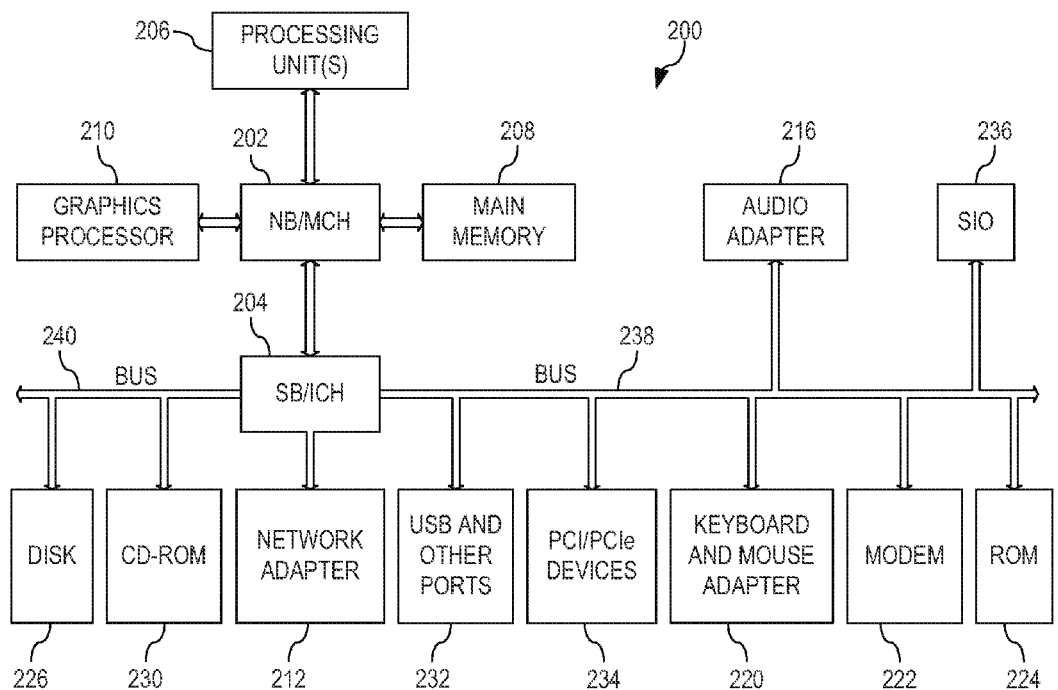
FIG. 2 is a block diagram of an example data processing system in which aspects of the illustrative embodiments may be implemented.

Accordingly, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
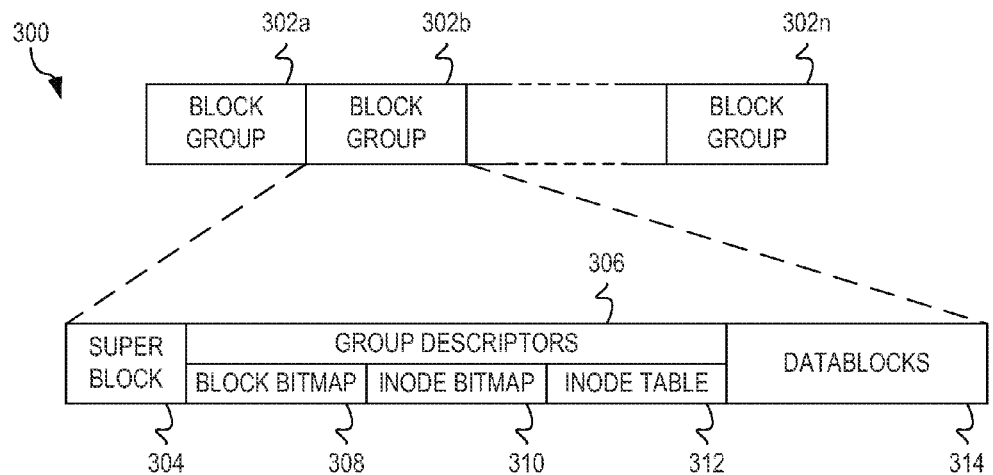
FIG. 3 depicts an exemplary physical layout of a file system in accordance with an illustrative embodiment.

Again a file system organizes data in an efficient manner and is tuned to characteristics specific to the device or disk which comprises the file system, such as hard disk drive (HDD) 226 of FIG. 2. FIG. 3 depicts an exemplary physical layout of a file system in accordance with an illustrative embodiment. As shown in FIG. 3, file system 300 is built on the premise that the data held in files is kept in blocks which are then grouped into block groups, such as block groups 302a, 302b, . . . , and 302n. These block groups are normally the same length and, although that length can vary between different file systems, the block size of a particular file system is set when the file system is created. Not all of the blocks in each block group hold data, some must be used for information that describes the structure of the block group. For example, a block group may comprise: superblock 304 and group descriptors 306. Group descriptors 306 may further comprise block bitmap 308, inode bitmap 310, inode table 312, or the like, in addition to datablocks 314.

Superblock 304 may comprise a description of the basic size and shape of this file system, which allows a file system manager to use and maintain the file system. Usually only superblock 304 in block group 302a is read when the file system is mounted but each block group contains a duplicate copy in case of file system corruption. Superblock 304 may comprise a magic number, revision level, mount count and maximum mount count, block group number, block size, block per group, free blocks, free inodes, first inode, or the like. The magic number allows mounting software to check that superblock 304 is for the file system. The revision level allows mounting code to determine whether or not this file system supports features that are only available in particular revisions of the file system. There may also be feature compatibility fields (not shown) which help the mounting code to determine which new features can safely be used on this file system.

Together, the mount count and maximum mount count allow the data processing system to determine whether the file system should be fully checked. The mount count is incremented each time the file system is mounted and, when the mount count equals the maximum mount count, a warning message "maximal mount count reached, running file system check is recommended" is displayed. The block group number identifies the copy of the superblock. The block size identifies the size of the block for this file system in bytes, for example 1024 bytes. The blocks per group identify a number of blocks in a group, such as the block size as fixed when the file system is created. The free blocks identifier identifies a number of free blocks in the file system. The free inodes identifier identifies a number of free inodes in the file system and the first inode identifier identifies an inode number of the first inode in the file system, such as a directory entry for the '/' directory.

Group descriptors 306 is a data structure describing the block group. Like superblock 304, all group descriptors for all of block groups are duplicated in each block group in case of file system corruption. Again, group descriptors 306 may further comprise block bitmap 308, inode bitmap 310, and inode table 312. Block bitmap 308 identifies the block number of the block allocation bitmap for the block group, which is used during block allocation and deallocation. Inode bitmap 310 identifies the block number of the inode allocation bitmap for this block group, which is used during inode allocation and deallocation. Inode table 312 identifies the block number of the starting block for the inode table for this block group.

Figure 4:
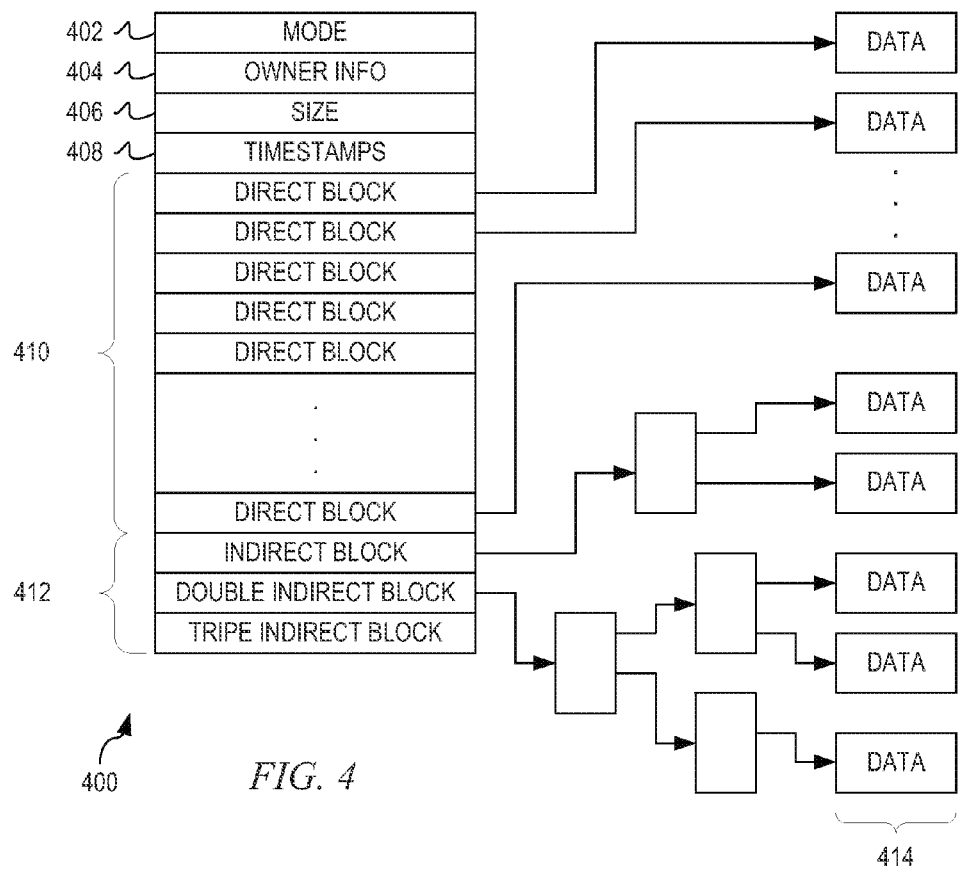
FIG. 4 depicts an example of an inode in accordance with an illustrative embodiment.

In a file system, an inode is the basic building block. Every file and directory in the file system is described by one and only one inode. Inodes for each block group is kept in an inode table together with a bitmap that allows the system to keep track of allocated and unallocated inodes. FIG. 4 depicts an example of an inode in accordance with an illustrative embodiment. Amongst other information, inode 400 comprises mode 402, owner information 404, size indicator 406, timestamps 408, direct datablocks 410, and indirect datablocks 412. Mode 402 holds two pieces of information: what inode 400 describes, such as file, directory, symbolic link, block device, character device, FIFO, or the like, and the permissions that users have to inode 400. Owner information 404 identifies user and group identifiers of the owners of this file or directory, which allows the file system to correctly allow the correct accesses. Size indicator 406 identifies the size of the file in bytes. Timestamps 408 identifies the time that inode 400 was created and the last time that inode 400 was modified. Direct datablocks 410 and indirect datablocks 412 identify pointers to the blocks that contain data 414 that inode 400 is describing. Direct datablocks 410 are pointers to the physical blocks containing data 414 described by inode 400 and indirect datablocks 412 are pointers identifying more and more levels of indirection. For example, double indirect datablocks 414 pointer points at a block of pointers to blocks of pointers to data 414.

Thus, as data is stored on a disk or device, the data is stored in a block through the previously described block allocation process. Again, the primary premise of the block allocation strategy for the data to be referenced by only one allocated inode. However, during operation of the data processing systems, any particular block of data is allocated and deallocated and the inode that describes that data is allocated and deallocated. Therefore, events may occur when more than one inode refers to a same allocated block due to issues within allocation and/or deallocation. A block that is referred to by more than one inode is referred to as a cross-allocated block or a duplicate block. Such allocations are quite dangerous as one of the inodes point to data corruption.

Figure 5:
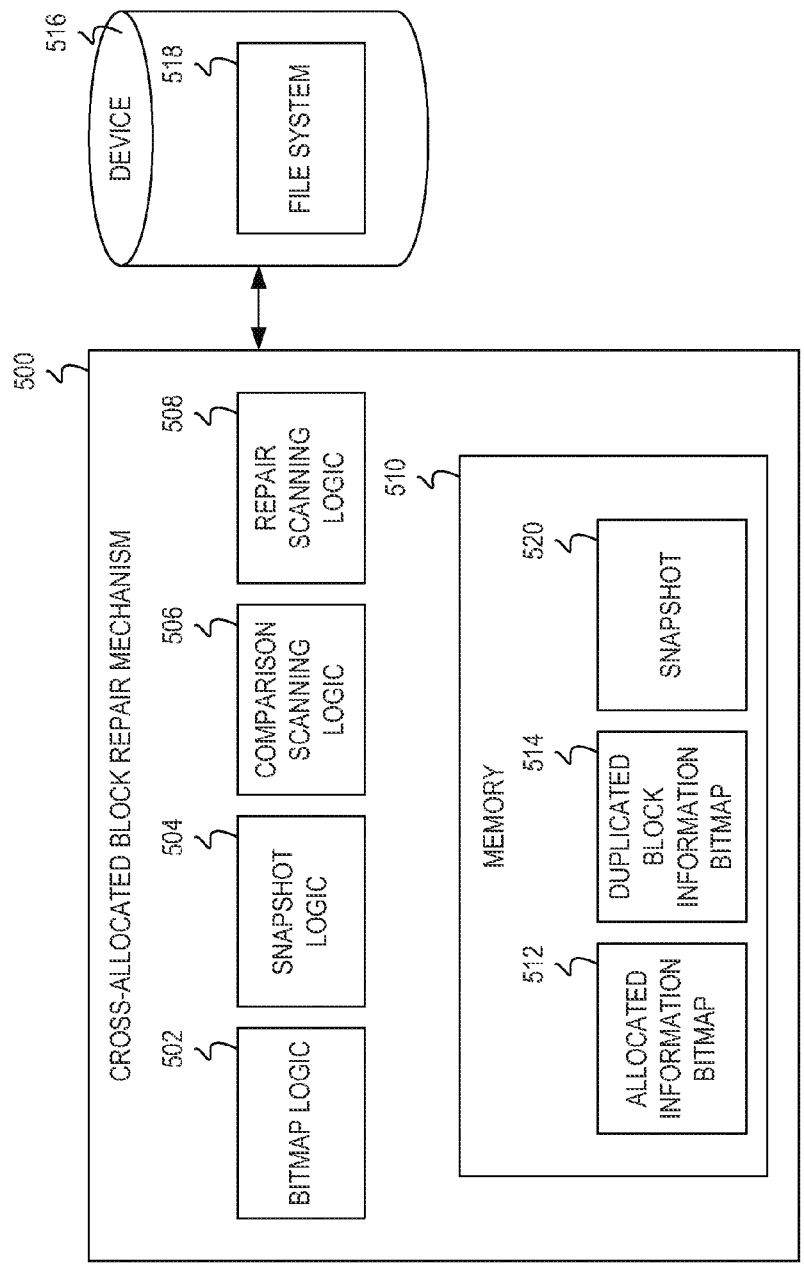
FIG. 5 depicts a functional block diagram of a cross-allocated block repair mechanism for a mounted file system in accordance with an illustrative embodiment.

FIG. 5 depicts a functional block diagram of a cross-allocated block repair mechanism for a mounted file system in accordance with an illustrative embodiment. Cross-allocated block repair mechanism 500, which may be executed by a processor such as processing unit 206 of FIG. 2, comprises bitmap logic 502, snapshot logic 504, comparison scanning logic 506, and repair scanning logic 508. When cross-allocated block repair mechanism 500 is initiated, bitmap logic 502 generates allocation information bitmap 512 and duplicated block information bitmap 514 in memory 510 for file system 518 on device 516. Each bit within allocation information bitmap 512 and duplicated block information bitmap 514 represents a file system block in file system 518. Allocation information bitmap 512 represents the allocation state of file system 518. Duplicated block information bitmap 514 represents blocks that are cross allocated across multiple inodes or multiple times within a same inode. Bitmap logic 502 initially sets each bit in allocation information bitmap 512 and duplicated block information bitmap 514 to an OFF state.

With the bitmaps generated, snapshot logic 504 captures a point-in-time copy or snapshot 520 of the file system state of file system 518. Comparison scanning logic 506 then scans the entire inode range from snapshot 520 from the starting inode to the maximum allocated inode. To perform this scan, one by one, comparison scanning logic 506 locks an inode in snapshot 520 and the same inode in file system 518 to ensure that there are no modifications to the inode or its block allocation while the scan is being performed. With both inodes locked, comparison scanning logic 506 reads the inode's block allocation state from snapshot 520 and file system 518. Comparison scanning logic 506 then identities the file system blocks associated with the inode from snapshot 520 and file system 518. For each identified file system block, comparison scanning logic 506 records each identified block by setting its corresponding bit in allocation information bitmap 512 to an ON state.

If comparison scanning logic 506 tries to turn on a bit that is already set to ON in allocation information bitmap 512, then comparison scanning logic 506 recognizes that the file system block was already discovered as being associated with a previously scanned inode, thereby indicating across-allocated block. If such an event occurs, comparison scanning logic 506 records the cross-allocated block by setting its corresponding bitmap in duplicated block information bitmap 514 to an ON state. Once comparison scanning logic 506 completes scanning the entire inode range in snapshot 520, duplicated block information bitmap 514 comprises a list of all file system blocks that are cross located at the time snapshot 520 of file system 518 was generated.

At this point, repair scanning logic 508 scans the entire inode range in file system 518 by locking each inode and walking the block allocation state of each inode. Walking indicates stepping through the entire data presented by each inode in file system 518 bit by bit. If repair scanning logic 508 encounters a file system block in the locked inode of file system 518 whose corresponding bit in duplicated block information bitmap 514 is set to ON, repair scanning logic 508 repairs the cross-allocated block based on a user-defined repair. The user defined repair may comprise, for example, marking all the cross-allocated file system blocks in each set of cross-allocated blocks as free, or marking all but one of the cross-allocated file system blocks in the set of cross-allocated blocks as free. Repair scanning logic 508 also deallocates all cross-allocated blocks that are marked as free. The repair process performed by repair scanning logic 508 is completed once all of the inodes in file system 518 have been scanned and all cross-allocated blocks in the inode repaired. While the description indicates starting with an OFF state and transitioning to an ON state, it will be appreciated by one of ordinary skill in the art that the illustrative embodiments may start with any state and transition to another state as long as an indication of the transition is evident.

Thus, cross-allocated block repair mechanism 500 repairs or removes cross-allocated blocks that are identified from snapshot 520. Any allocations occurring after the generation of snapshot 520 may lead to new cross allocations but will be corrected during subsequent executions of cross-allocated block repair mechanism 500. Therefore, the execution of cross-allocated block repair mechanism 500 ensures that the cross-allocated blocks are repaired to the maximum possible extent with file system 518 online and continuing to be used. In cases of severe corruptions, file system 518 may be unmounted and cross-allocated block repair mechanism 500 may be executed offline.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
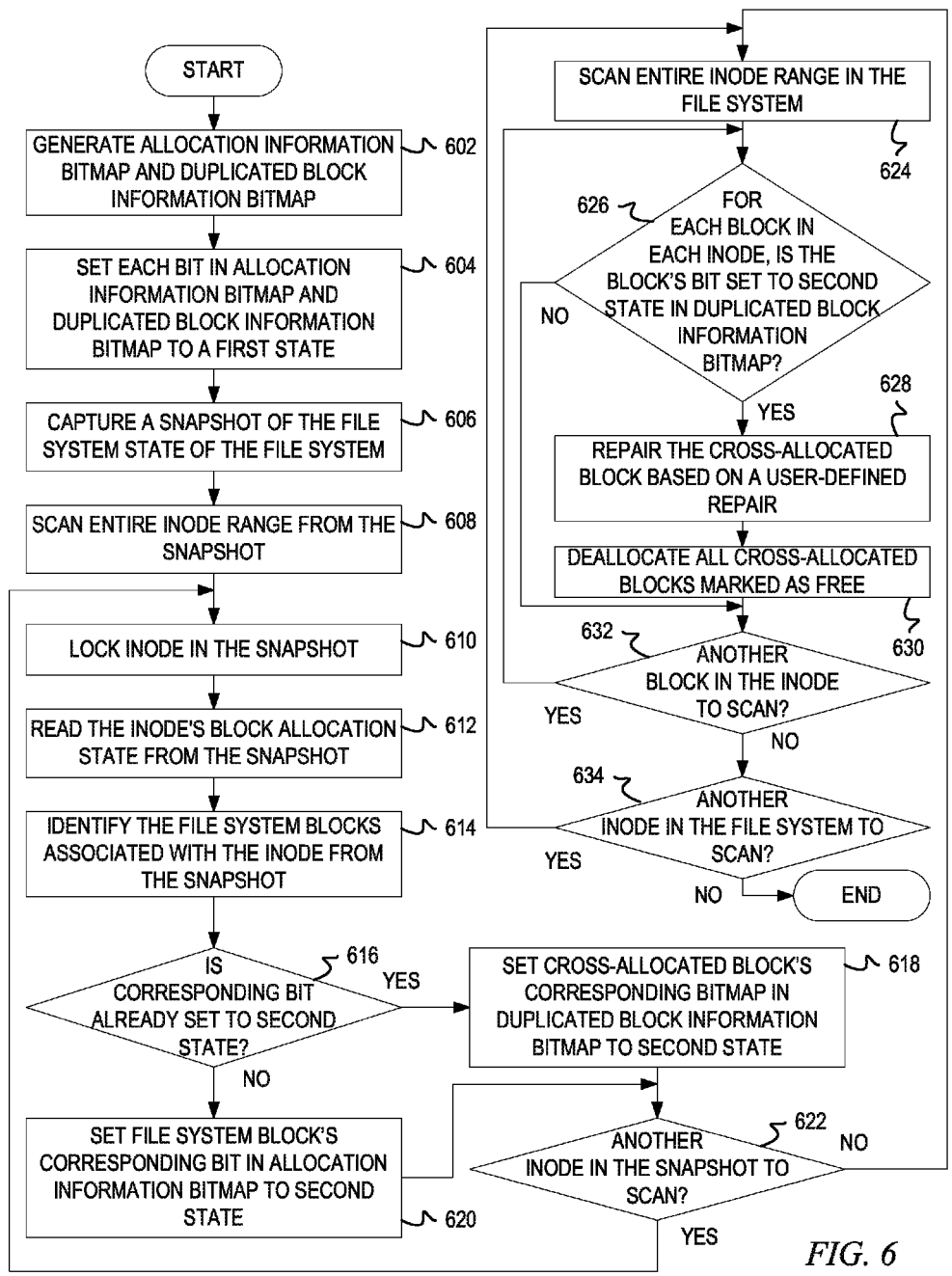
FIG. 6 depicts a flow diagram of the operation performed by a cross-allocated block repair mechanism for a mounted file system in accordance with an illustrative embodiment.

FIG. 6 depicts a flow diagram of the operation performed by a cross-allocated block repair mechanism for a mounted file system in accordance with an illustrative embodiment. As the operation begins, bitmap logic within cross-allocated block repair mechanism generates an allocation information bitmap and a duplicated block information bitmap in memory for a file system on a device (step 602). Each bit within the allocation information bitmap and the duplicated block information bitmap represents a file system block in the file system. The allocation information bitmap representing the allocation state of the file system and the duplicated block information bitmap representing blocks that are cross allocated across multiple inodes or multiple times within a same inode. The bitmap logic initially sets each bit in the allocation information bitmap and the duplicated block information bitmap to a first state (step 604).

With the bitmaps generated, snapshot logic within the cross-allocated block repair mechanism captures a point-in-time copy or snapshot of the file system state of the file system (step 606). Comparison scanning logic within the cross-allocated block repair mechanism then scans the entire inode range from the snapshot from the starting inode to the maximum allocated inode (step 608). To perform this scan, one by one, the comparison scanning logic locks an inode in the snapshot and the same inode in the file system (step 610) to ensure that there are no modifications to the inode or its block allocation while the scan is being performed. With both inodes locked, the comparison scanning logic reads the inode's block allocation state from the snapshot and the file system (step 612). The comparison scanning logic then identifies the file system blocks associated with the inode from the snapshot and the file system (step 614).

For each identified file system block, the comparison scanning logic determines whether a corresponding bit in the allocation information bitmap is already set to a second state (step 616). If the comparison scanning logic determines that the corresponding bit in the allocation information bitmap is already set to the second state, then the comparison scanning logic recognizes that the file system block was already discovered as being associated with a previously scanned inode, thereby indicating a cross-allocated block, and records the cross-allocated block by setting its corresponding bitmap in the duplicated block information bitmap to an second state (step 618). If the comparison scanning logic determines that the corresponding bit in the allocation information bitmap is not set to the second state, then the comparison scanning logic records each identified block by setting its corresponding bit in the allocation information bitmap to the second state (step 620).

From steps 618 and 620, the comparison scanning logic then determines whether there is another inode in the snapshot to scan (step 622). If at step 622 there is another inode in the snapshot to scan, then the operation returns to step 610. If at step 622 there is not another inode in the snapshot to scan, then the repair scanning logic scans the entire inode in the file system by locking each inode and walking the block allocation state of each inode (step 624). For each file system block in the locked inode in the file system, the repair scanning logic determines whether the file system block's bit is set to the second state in the duplicated block information bitmap (step 626). If at step 626, the repair scanning logic encounters a file system block in the file system whose corresponding bit in the duplicated block information bitmap is set to the second state, the repair scanning logic repairs the cross-allocated block based on a user-defined repair (step 628). The repair scanning logic also deallocates all cross-allocated blocks that are marked as free (step 630). From steps 626 or 630, the repair scanning logic determines whether there is another file system block in the inode to scan (step 632). If at step 632 there is another file system block in the inode to scan, then the operation returns to step 626. If at step 632 there is not another file system block in the inode to scan, then the repair scanning logic determines if there is another inode in the file system to scan (step 634). If at step 634 there is another inode to scan then the operation returns to step 624. If at step 634 there is not another inode to scan then the operation terminates.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for identifying file system blocks that are cross allocated across inodes and repairing the cross-allocated block while on a mounted file system. The mechanisms identify the cross-allocated blocks by scanning a point in time read only copy of the file system, i.e. temporary snapshots taken just before the scan begins, and use this information as a reference point to scan the mounted file system and repair the inodes which refer to the identified cross-allocated blocks. The mechanisms ensure that the cross-allocated blocks are repaired without a need for file system outage.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for cross-allocated block repair in a mounted file system, the method comprising:

identifying, by a processor in the data processing system, a set of cross-allocated blocks from a plurality of blocks within an inode of the mounted file system, based on a corresponding bit associated with each cross-allocated block in a duplicated block information bitmap being in a first identified state, wherein the duplicated block information bitmap is populated by the method comprising:

capturing, by the processor, a snapshot of the mounted file system, wherein the snapshot is a point-in-time copy of a file system state of the mounted file system;

scanning, by the processor, an entire inode range of the snapshot;

for each inode in the inode range, identifying, by the processor, file system blocks associated with the inode;

responsive to identifying each file system block associated with the inode, determining, by the processor, whether a corresponding bit in an allocation information bitmap is in a second identified state;

responsive to the corresponding bit in the allocation information bitmap being in the second identified state, updating, by the processor, the corresponding bit in the duplicated block information bitmap to the first identified state; and responsive to the corresponding bit in the allocation information bitmap failing to be in the second identified state, updating, by the processor, the corresponding bit in the allocation information bitmap to the second identified state;

repairing, by the processor, the set of cross-allocated blocks using a user-defined repair process; and deallocating, by the processor, one or more of the set of cross-allocated blocks based on results of the user-defined repair process.

2. The method of claim 1, wherein the user defined repair process is marking all of the set of cross-allocated blocks as free.

3. The method of claim 1, wherein the user defined repair process is marking all but one of the set of cross-allocated blocks as free.

4. The method of claim 1, wherein, prior to identifying the file system blocks associated with the inode, the inode is locked to ensure that no modifications are made to the inode or the inode's block allocation while the identification is being performed.

5. A computer program product comprising a non-transitory computer readable storage medium having a computer readable program stored therein, wherein the computer readable program, when executed on a computing device, causes the computing device to:

identify a set of cross-allocated blocks from a plurality of blocks within an inode of the mounted file system, based on a corresponding bit associated with each cross-allocated block in a duplicated block information bitmap being in a first identified state, wherein the computer readable program populates the duplicated block information bitmap by causing the computing device to:

capture a snapshot of the mounted file system, wherein the snapshot is a point-in-time copy of a file system state of the mounted file system;

scan an entire inode range of the snapshot;

for each inode in the inode range, identify file system blocks associated with the inode;

responsive to identifying each file system block associated with the inode, determine whether a corresponding bit in an allocation information bitmap is in a second identified state;

responsive to the corresponding bit in the allocation information bitmap being in the second identified state, update the corresponding bit in the duplicated block information bitmap to the first identified state; and responsive to the corresponding bit in the allocation information bitmap failing to be in the second identified state, update the corresponding bit in the allocation information bitmap to the second identified state;
repair the set of cross-allocated blocks using a user-defined repair process; and
deallocate one or more of the set of cross-allocated blocks based on results of the user-defined repair process.

6. The computer program product of claim 5, wherein the user defined repair process is marking all of the set of cross-allocated blocks as free.

7. The computer program product of claim 5, wherein the user defined repair process is marking all but one of the set of cross-allocated blocks as free.

8. The computer program product of claim 5, wherein, prior to identifying the file system blocks associated with the inode, the computer readable program causes the computing device to lock the inode to ensure that no modifications are made to the inode or the inode's block allocation while the identification is being performed.

9. An apparatus, comprising:
a processor, and
a memory coupled to the processor, wherein the memory comprises instructions which, when executed by the processor, cause the processor to:
identify a set of cross-allocated blocks from a plurality of blocks within an inode of the mounted file system, based on a corresponding bit associated with each cross-allocated block in a duplicated block information bitmap being in a first identified state, wherein the instructions populate the duplicated block information bitmap by causing the processor to:
capture a snapshot of the mounted file system, wherein the snapshot is a point-in-time copy of a file system state of the mounted file system;
scan an entire inode range of the snapshot;
for each inode in the inode range, identify file system blocks associated with the inode;
responsive to identifying each file system block associated with the inode, determine whether a corresponding bit in an allocation information bitmap is in a second identified state;
responsive to the corresponding bit in the allocation information bitmap being in the second identified state, update the corresponding bit in the duplicated block information bitmap to the first identified state; and
responsive to the corresponding bit in the allocation information bitmap failing to be in the second identified state, update the corresponding bit in the allocation information bitmap to the second identified state;
repair the set of cross-allocated blocks using a user-defined repair process; and
deallocate one or more of the set of cross-allocated blocks based on results of the user-defined repair process.

10. The apparatus of claim 9, wherein the user defined repair process is marking all of the set of cross-allocated blocks as free.

11. The apparatus of claim 9, wherein the user defined repair process is marking all but one of the set of cross-allocated blocks as free.

12. The apparatus of claim 9, wherein, prior to identifying the file system blocks associated with the inode, the instructions causes the processor to lock the inode to ensure that no modifications are made to the inode or the inode's block allocation while the identification is being performed.

* * * * *